(12) United States Patent
Crawford (10) Patent No.: US 10,379,969 B2
(45) Date of Patent: Aug. 13, 2019

(54) EPHEMERAL STORE-BASED AUTO-SAVE FOR APPLICATIONS WITH A PERSISTENCE LAYER

(71) Applicant: Business Objects Software Ltd., Dublin (IE)

(72) Inventor: James Crawford, Dublin (IE)

(73) Assignee: Business Objects Software Ltd., Dublin (IE)

( * ) Notice: Subject to any disclaimer, the term of this patent is extended or adjusted under 35 U.S.C. 154(b) by 267 days.

(21) Appl. No.: 14/964,244

(22) Filed: Dec. 9, 2015

(65) Prior Publication Data

US 2017/0169072 A1 Jun. 15, 2017

(51) Int. Cl.
*G06F 11/14* (2006.01)
*G06F 16/2455* (2019.01)

(52) U.S. Cl.
CPC .... *G06F 11/1474* (2013.01); *G06F 16/24552* (2019.01)

(58) Field of Classification Search
CPC ......... G06F 17/30377; G06F 17/30371; G06F 17/30339; G06F 11/1474; G06F 2201/87
USPC ........................................................ 707/649
See application file for complete search history.

(56) References Cited

U.S. PATENT DOCUMENTS

| 7,437,364 | B1 * | 10/2008 | Fredricksen et al. | |
|---|---|---|---|---|
| 9,477,535 | B2 * | 10/2016 | Crawford | G06F 9/54 |
| 2006/0156023 | A1 * | 7/2006 | Luo | G06F 21/6227 713/182 |
| 2008/0228923 | A1 * | 9/2008 | Chidambaran | H04L 67/14 709/227 |
| 2012/0271852 | A1 * | 10/2012 | Fredricksen et al. | 707/782 |
| 2014/0229525 | A1 * | 8/2014 | Crawford | G06F 9/54 709/203 |

* cited by examiner

*Primary Examiner* — Jean B Fleurantin
(74) *Attorney, Agent, or Firm* — Fish & Richardson P.C.

(57) ABSTRACT

The disclosure generally describes methods, software, and systems, including a method for using and managing ephemeral tables. User inputs associated with a database management system are received from an application. The user inputs are associated with a particular user and a particular application. From an auto-save cache index, one or more ephemeral tables are identified that are associated with the user inputs. The ephemeral tables are mapped to one or more tables in the database management system. Using the user inputs and the auto-save cache index, the one or more ephemeral tables are updated. Information associated with the user inputs is automatically stored on a temporal basis. The information survives database sessions, transaction boundaries, and database management system restarts.

19 Claims, 4 Drawing Sheets

EPHEMERAL STORE-BASED AUTO-SAVE FOR APPLICATIONS WITH A PERSISTENCE LAYER

BACKGROUND

The present disclosure relates to auto-saving data.

Many applications, including cloud-based web applications and fat clients (e.g., traditional desktop applications), persist data sets to a database management system (DBMS). For example, the data sets can consist of many small fields (e.g., a user's registration data), large text fields (e.g., a blog), or a combination of both (e.g., a questionnaire with comments sections). Users may invest significant effort and time entering these data sets. As a result, if data is lost during data entry, re-producing the data can be costly, time-consuming, and frustrating.

SUMMARY

The disclosure generally describes computer-implemented methods, software, and systems for using ephemeral tables for auto-saved user inputs in database-backed application. User inputs associated with a database management system are received from an application. The user inputs are associated with a particular user and a particular application. From an auto-save cache index, one or more ephemeral tables are identified that are associated with the user inputs. The ephemeral tables are mapped to one or more tables in the database management system. Using the user inputs and the auto-save cache index, the one or more ephemeral tables are updated. Information associated with the user inputs is automatically stored on a temporal basis. The information survives database sessions, transaction boundaries, and database management system restarts.

One computer-implemented method includes: receiving, from an application, user inputs associated with a database management system, the user inputs being associated with a particular user and a particular application; identifying, from an auto-save cache index, one or more ephemeral tables that are associated with the user inputs, the ephemeral tables mapped to one or more tables in the database management system; and updating, using the user inputs and the auto-save cache index, the one or more ephemeral tables: automatically storing, on a temporal basis, information associated with the user inputs; and surviving database sessions, transaction boundaries, and database management system restarts.

The foregoing and other implementations can each optionally include one or more of the following features, alone or in combination. In particular, one implementation can include all the following features:

In a first aspect, combinable with any of the previous aspects, the method further includes performing a save/commit operation, including: receiving an indication to perform a save/commit operation; using an ephemeral-table-to-schema binding to determine database tables in the database management system that are to be updated based on entries in the one or more ephemeral tables; and updating the determined database tables using entries associated with the user inputs in the one or more ephemeral tables. In the first aspect, as well as other aspects described below, a user associated with the entries and an application associated with the user are identified.

In a second aspect, combinable with any of the previous aspects, updating the determined database tables includes using one or more auto-save update/insert interceptors that update the determined database tables using one or more application schemas.

In a third aspect, combinable with any of the previous aspects, the method further includes: maintaining metadata associated with the auto-save cache, the metadata describing details regarding data being persisted in the one or more ephemeral tables; and using the maintained metadata when updating the determined database tables.

In a fourth aspect, combinable with any of the previous aspects, the method further includes: receiving an indication to cancel the user inputs that have been auto-saved, including identifying the particular user and the particular application associated with the user inputs; and clearing the user inputs from the auto-save cache, including deleting corresponding entries in the one or more ephemeral tables associated with the particular user and the particular application.

In a fifth aspect, combinable with any of the previous aspects, the method further includes: receiving an indication to recover the user inputs that have been auto-saved, including identifying the particular user and the particular application associated with the user inputs; retrieving the user inputs from the auto-save cache, including entries in the one or more ephemeral tables associated with the particular user and the particular application; and providing the user inputs.

In a sixth aspect, combinable with any of the previous aspects, the method further includes: receiving an indication to revert the user inputs to a previous version, including identifying the particular user and the particular application associated with the user inputs; receiving a version of interest associated with the user inputs; retrieving the user inputs from the auto-save cache, including entries in the one or more ephemeral tables associated with the version, the particular user, and the particular application; and providing the user inputs.

The subject matter described in this specification can be implemented in particular implementations so as to realize one or more of the following advantages. Security can be improved because the data is managed by a secure database, eliminating the need to store sensitive data on a client side. Updating related security models can be simplified since there is a direct mapping between client dialogs and ephemeral tables. Ephemeral store-based auto-saving, using a collection of ephemeral tables, can be device/client agnostic, e.g., User A can be working on a desktop browser-based client half-way through data entry and switch seamlessly to a native smartphone application with little or no loss of data. Ephemeral store-based auto-saving can be extremely fault tolerant, addressing issues caused when applications or even machines crash and facilitating seamless switching of input devices. Ephemeral store-based auto-saving can provide business with benefits in terms of integrated customer relationship management CRM, e.g., a shopping cart can be introspected to see what the user is interested in even if they don't go ahead with the purchase. Since ephemeral store-based auto-saving functionality can be provided by the DBMS developers (e.g., as opposed to application developers), the functionality can be tuned and optimized for each DBMS implementation. Ephemeral store-based auto-saving solutions can provide a standard auto-save solution that is robust, reliable, and easy to use from a designer's and developer's perspective. Delegating the implementation of auto-save to the DBMS can ensure a standard implementation that behaves consistently and reduces or eliminates the design and development effort involved in providing the functionality to application users. Unlike cookies, ephemeral store-based auto-saving solutions cannot be disabled by the user (e.g., unless specifically allowed). Ephemeral store-based auto-saving solutions can be extended and configured as a replacement for cookies, e.g., providing at least one benefit of not being bound to a particular device and also a much more secure implementation. Desktop applications that are backed by databases can also benefit from the use of consistent auto-save APIs, increased security, machine-to-machine mobility, e.g., applicable to fat (desktop) clients. For shopping cart applications, e.g., on eCommerce sites, a commit can be called when an order is finalized if the cart is abandoned, post auto-save and prior to finalization. In this way, the cart can be introspected providing insights to the intent of the customer, aiding personalization.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for using ephemeral tables for auto-saved user inputs in database-backed applications. For example, the user inputs can be represented in ephemeral tables with entries that are mapped to a particular user and application instance. The ephemeral tables, once populated, can be used, for example, to commit the user inputs to the database, cancel the user inputs, recover lost user inputs, or revert to a previous version of the user inputs. Using ephemeral tables can provide advantages over other types of solutions that are described next. For example, ephemeral tables are short-lived tables that can provide the benefits of other database tables but are temporal in nature. Further, ephemeral tables can be optimized for writing, but need not be optimized for reading. Instances of ephemeral tables can differ from local and global temporary tables, e.g., because ephemeral tables can survive database sessions, transactions boundaries, and database management system (DBMS) restarts. Instances of ephemeral tables can also differ from regular database (DB) tables as they are not permanently persisted. The life cycle of ephemeral tables is variable, e.g., time-based, content-based, context-based, or for other reasons. An ephemeral table can support eCommerce needs, e.g., for caching a shopper's online shopping cart. The application of ephemeral tables is not limited to the auto-save application as they can add significant value to many more RDBMS use cases. For example, there are scenarios in which users require non-permanent tables that survive DB session boundaries but are not permanent in nature like regular tables. For example, during the operation of applications, it may be necessary to retain a non-permanent state that transcends DB sessions. For example, parameters impacting the result of a query can be entered on one page of a web application and the execution initiated from another page.

A major challenge facing architects and designers when designing database (DB) backed applications, web applications, or other applications, for example, is ensuring that data loss, during entry, is eliminated or at least reduced to such a level that it has little or no impact on application users. Data loss during entry can occur due to a variety of reasons. For example, connections closure is one of the main causes of data loss for database-backed web applications. Connection closure can happen, for example, for a variety of reasons, such as: browser/application crashes, network errors, application inactivity, inadvertent closure of the browser, an intentional or inadvertent refresh on the browser, or clearing the browser cache. Data loss may also occur if the user inadvertently hits the back button on the browser (or on a mouse) or if the user intentionally navigates away from the page. Data lost can also occur from a failure of the user's machine, such as caused by a hardware fault, an operating system (OS) fault, or a power loss.

In some implementations, architects and system designers may attempt to prevent data loss by implementing some form of auto-save functionality. For example, typically auto-save functionality can include caching data on the client machine (e.g., using cookies or using local web storage) or persisting the data to a back-end database management system (DBMS), e.g., relational or other DBMS.

In existing implementations, e.g., client-side auto-save implementations, auto-save options that are currently available to an application architect/designer may include, for example, auto-saving data on a client or auto-saving data on a database (DB) server. When client-side data caches are used, for example, client-side auto-save implementations for web-based clients can typically involve persisting the data to either a web store (e.g., either local or global) or a cookie store. Fat clients, on the other hand, can implement their own (e.g., "hand-rolled" or proprietary) auto-save data stores in a user's workspace or in temporary directories.

In existing implementations, e.g., client-side auto-save implementations that use local web storage, for example, leveraging web storage to auto-save data can involve writing temporary content into web storage. If, for some reason, a session ends prior to the data being saved by the application, the data (e.g., up to a particular save point) exists in the local web storage. A next time that the application starts, for example, the application can query web local storage to see if any auto-saved data resides there, and the application can provide the user with the option to populate the relevant input dialogs. In this and other auto-save mechanisms, the client is responsible for initiating the auto-save process, a recovery process, and/or other processes. A key point of difference with the technology disclosed herein is that updates can be pushed to the client.

In some implementations, e.g., client-side auto-save implementations, cookies can be used to auto-save data, e.g., by persisting temporary content as cookies. If a session of an application ends abnormally, e.g., prior to the data being saved by the application, the data (e.g., up to a particular save point) may exist in the cookie store. Then, the next time that the application starts, the application can inspect the cookies to determine if data has been auto-saved, and the application can provide the user with the option to populate the relevant input dialogs. In this and other auto-save mechanisms, the client is responsible for initiating the auto-save process, a recovery process, and/or other processes. A key point of difference with the technology disclosed herein is that updates can be pushed to the client.

In some implementations, e.g., client-side auto-save implementations that use "hand-rolled" or proprietary auto-save mechanisms, fat clients can auto-save data to a local file system. The "hand-rolled" or proprietary auto-save mechanisms can, for example, follow procedures that are similar to procedures that use local web storage and/or cookies. However, these auto-save mechanisms may involve more development effort since, in addition to the auto-save control logic, the data store also has to be implemented. In some implementations, a benefit of "hand-rolling" a cache can be that, unlike cookies and web local storage, the cache can be secured, and can't be disabled by the user.

In some implementations, e.g., client-side auto-save implementations, a server-side data cache can be used for auto-saving data. For example, both web-based and fat clients can leverage the same server-side auto-save data caches (e.g., DBMS tables or equivalent for document stores) added to the schema for the purpose of writing auto-saved data.

In some implementations, e.g., client-side auto-save implementations, permanent tables can be used for auto-saving data. For example, a common mechanism for a server-side auto-save cache can be used to persist the data to tables that have been designed to store the auto-saved data. This is typically done in the background using a separate thread in a fat client or AJAX in a web-based client.

Many cons and disadvantages of basing auto-save on existing client-side data caches may exist. For example, one of the main disadvantages of client-side data stores is that they need to be implemented for each client type. Other disadvantages include the following. Cookies and local web storage may not be secure and may be open to tampering. HTML5 web storage may not be supported by all browsers. Cookies may work adequately for small amounts of text but are not designed to really work for caching. Cookies and web storage can be disabled by the user. Data recovery is tied to user/client type/host combinations, which can prevent, for example, a user from recovering data if connecting from the same host with a different client, or if connecting from a different host. This can obviously limit the reliability of these mechanisms in scenarios where either the host or the client install crashes and cannot be recovered. The client is typically responsible for initiating the recovery process, e.g., recovery cannot be pushed to the client. The server has no visibility of the auto-saved content. This can be especially relevant for eCommerce websites where personalized offers can be made for incomplete transactions.

There can also be many cons and disadvantages of basing auto-save on existing server-side data caches, including but not limited to the following. Server-side data caches typically need to be implemented from the ground up on a per application basis. Because the client is also responsible for initiating the recovery process, recovery cannot be pushed to the client. Server-side data caches can typically provide non-standard implementations and do not provide an integrated solution.

In some implementations, e.g., including implementations that solve some of the disadvantages described above, solutions that include server-side auto-save caching can be used. For example, the auto-save functionality/implementation can be delegated to the DBMS. Doing so can involve the introduction of the following key/novel concepts. In some implementations, solutions described herein can be used in combination with other implementations that are described, including implementations described above, that have disadvantages when used alone or in other combinations.

Figure 1:
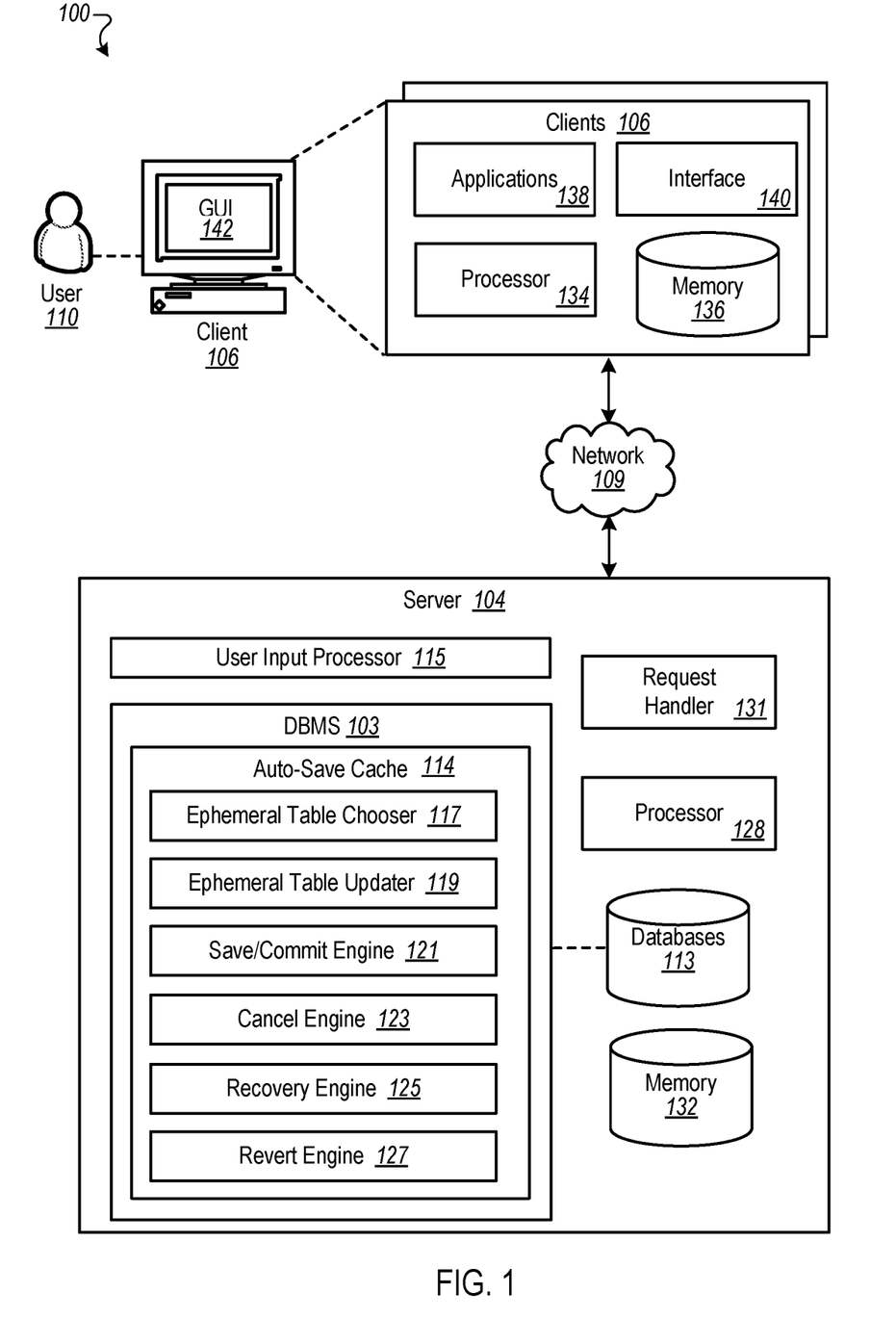
FIG. 1 is a block diagram of an example environment for using ephemeral tables to auto-save data associated with applications.

FIG. 1 is a block diagram of an example environment 100 for using ephemeral tables to auto-save data associated with applications. The illustrated environment 100 includes, or is communicably coupled with, at least one server 104 and plural clients 106, all connected using a network 109. The environment 100 can be used, for example, to provide and support applications on the one or more clients 106 using data from databases managed by the server 104 (e.g., a database management system (DBMS)). Each client 106 comprises an electronic computing device operable to provide information to a user, e.g., using data (e.g., from databases 113) from the server 104, and potentially from other sources, for display on web pages and/or for other uses. For example, an application executing on the client 106 can use data in one of the databases 113, and auto-saves can occur for user inputs associated with the data and the applications. Other architectures can be used for using ephemeral tables to auto-save data associated with applications, e.g., including architectures having a desktop with a local DBMS implementation.

At a high level, the server 104 comprises an electronic computing device operable to store and provide access to data objects for use by the plural clients 106. An auto-save cache 114, for example, can be used by (and/or implemented in) a database management system (DBMS) 103 for one or more specific databases 113. In some implementations, there can be plural auto-save caches 114, each associated with one or more databases 113, such as auto-save caches 114 that support web page input, form entry, and/or other applications that have associated user inputs. For example, when there are multiple co-operating auto-save caches, one cache can be a master that assumes a coordination/delegation role. In some implementations, the data store of databases 113 can be stored or distributed in plural locations, e.g., at the server 104 and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 and the clients 106 may be any computer or processing device. In some implementations, the server 104 may be distributed in different locations and coupled using the network 109.

The server 104 includes a processor 128 and memory 132. Although illustrated as the single processor 128 in FIG. 1, two or more processors 128 may be used according to particular needs, desires, or particular implementations of the environment 100. Generally, the processor 128 executes instructions and manipulates data to perform the operations of the server 104. Specifically, the processor 128 executes the functionality required to receive and process requests from the server 104. In some implementations, the memory 132 can store the data store of databases 113. Further, the server 104 can maintain an auto-save cache 114, details of which are provided in an example with reference to FIG. 2. The auto-save cache 114 can be used to store, for example, user inputs associated with the applications 138.

Figure 2:
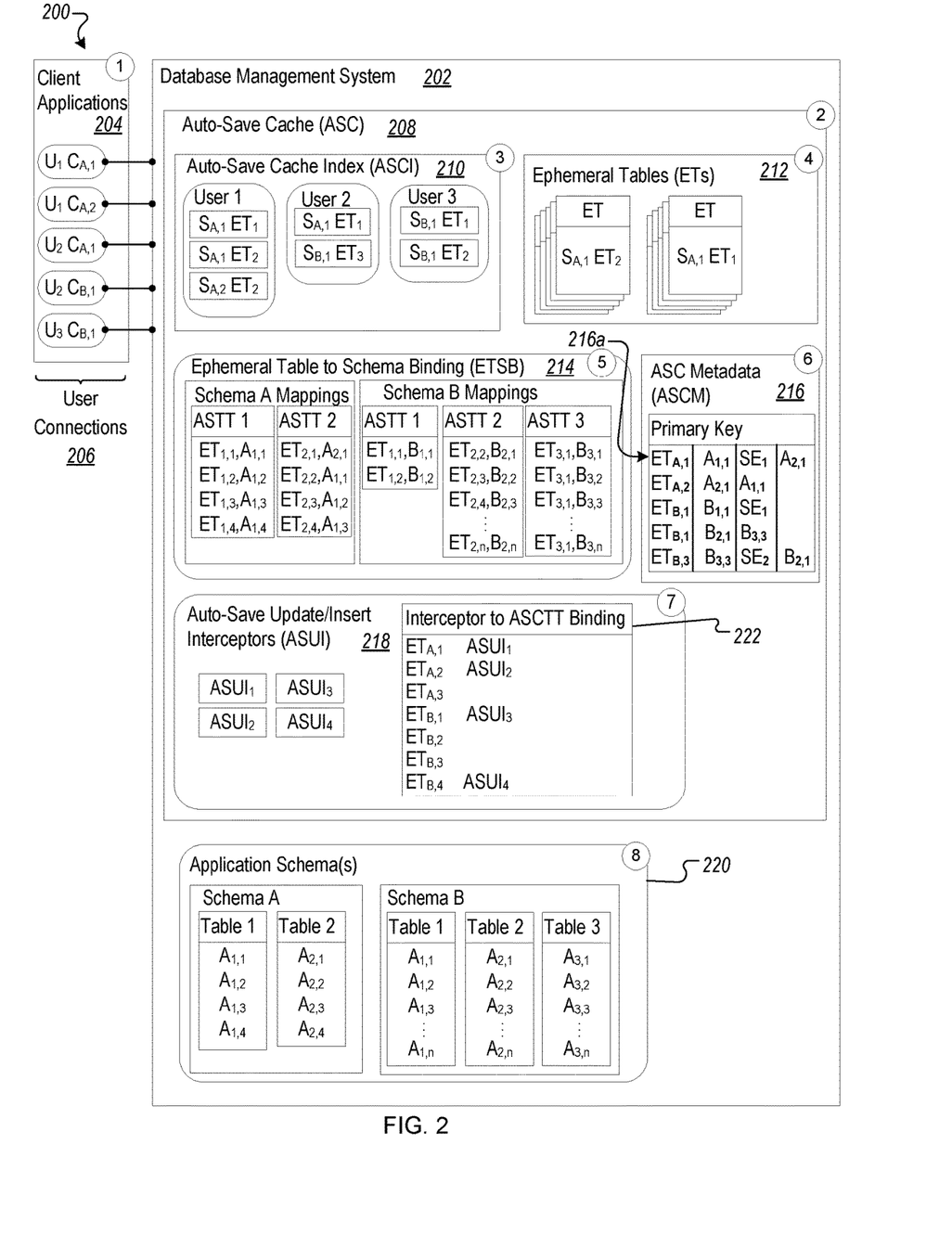
FIG. 2 is a block diagram showing an example of a system for using ephemeral tables for auto saves from database applications.

The auto-save cache 208 includes a user input processor 115 for receiving user inputs (e.g., text input on a web page) from an application 138, the user inputs being associated with the databases 113. The user inputs can be associated with a particular user and a particular application. In some implementations, the received user inputs can be processed first by a request handler 131, which can then provide the received user inputs to the user input processor 115 for processing.

The auto-save cache 208 includes an ephemeral table chooser 117 for identifying specific ephemeral tables that are to be updated in order to auto-save received user inputs. For example, the ephemeral tables that are to be used for auto-saving particular received user inputs can be identified using an auto-save cache index that maps the ephemeral tables to one or more tables in the database management system.

The auto-save cache 208 includes an ephemeral table updater 119 for updating one or more ephemeral tables according to the received user inputs. For example, the ephemeral table updater 119 can update one or more specific ephemeral tables that are identified from the auto-save cache index.

The auto-save cache 208 can also include other engines and/or components. For example, a save/commit engine 121 can be used for committing user inputs to the databases 113, a cancel engine 123 can be used for canceling user inputs (e.g., deleting ET 212 entries for a particular GUID), a recovery engine 125 can be used for recovering user inputs that have been lost at the client 106, and a revert engine 127 can be used to provide user inputs that allow the client 106 to revert to an earlier version.

The memory 132 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104.

Each client 106 of the environment 100 may be any computing device operable to connect to, or communicate with, other systems via a local DB or via the network 109 using a wire-line or wireless connection. In general, each client 106 comprises an electronic computer device operable to receive, transmit, process, and store any appropriate data associated with the environment 100 of FIG. 1.

The request handler 131, e.g., can handle requests received from the clients 106, e.g., for data to be provided from one or more databases 113, and for user inputs that are to be stored using the auto-save cache 114. In some implementations, the databases 113 can be implemented using one or more relational databases and/or other storage structures, and the stored data may be stored locally or distributed.

The illustrated client 106 further includes a processor 134, a memory 136, applications 138 (e.g., a browser), and an interface 140. The interface 140 is used by the client 106 for communicating with other systems in a distributed environment—including within the environment 100—connected to the network 109, e.g., other systems communicably coupled to the network 109 (not illustrated). Generally, the interface 140 comprises logic encoded in software and/or hardware in a suitable combination and operable to communicate with the network 109. More specifically, the interface 140 may comprise software supporting one or more communication protocols associated with communications such that the network 109 or interface's hardware is operable to communicate physical signals within and outside of the illustrated environment 100.

Applications 138 (e.g., browsers) can receive and provide information to the users 110 on each of the respective clients 106. As an example, in order to update a web page displayed in a browser on the client 106, the application 138 can provide a request for data from one or more databases 113 managed by the server 104. During input by a user of user inputs associated with the application 138, the user inputs can be provided to the server 104 for storage in the auto-save cache 114. Subsequently, commands may be provided by the application 138 (e.g., as specified by the user or determined automatically by the application 138) to commit (e.g., save) changes to the databases 113 that are associated with the user inputs stored in the auto-save cache 114. Other commands that can be provided include, for example, roll-back, cancel, merge, revert, and/or other operations associated with the auto-cached user inputs.

As illustrated in FIG. 1, the client 106 includes the processor 134. Although illustrated as the single processor 134 in FIG. 1, two or more processors 134 may be used according to particular needs, desires, or particular implementations of the environment 100. Generally, the processor 134 executes instructions and manipulates data to perform the operations of the client 106. Specifically, the processor 134 executes the functionality required to send requests to the server 104 and to receive and process responses from the server 104.

The illustrated client 106 also includes a memory 136. The memory 136 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 106.

The illustrated client 106 comprises a graphical user interface (GUI) 142, as shown with respect to and included by the client 106. The GUI 142 interfaces with at least a portion of the environment 100 for any suitable purpose, including user interface screens that display information associated with databases 113. For example, the user interface screens can provide user entry fields and/or other user entry controls for which a user can provide user inputs, e.g., through the applications 138. User inputs can include, for example, textual input, selections from controls (e.g., menus, lists, options or other elements), navigation commands (e.g., cursor/mouse movements), and/or complex structures (e.g., files, images, sounds, videos). In some implementations, user inputs can be associated with a context, e.g., a particular state or segment of an application.

FIG. 2 is a block diagram showing an example of a system 200 for using ephemeral tables for auto saves from database applications. The system 200 includes a database management system 202 that facilitates auto-saves of data from client applications 204 (e.g., for user connections 206). In some implementations, the system 200 can be implemented by the environment 100 described above and used, for example, for auto-saving user inputs entered on the client 106 through applications 138.

In some implementations, a globally unique identifier (GUID) can be used that identifies a particular user and application instance combination (e.g., uniquely identifying the user connections 206). A user connection 206 can contain temporary application instance information that is set, for example, when the connection is established, using the GUID. The database management system 202 that implements auto-saving can include an auto-save cache (ASC) 208, e.g., that includes components for facilitating (and serves as the high-level collection of concepts for) persisting auto-save data and managing the life cycle of ephemeral tables (ET) used in auto-saving. The ASC 208

(e.g., that can be used to implement the auto-save cache 114) includes an auto-save cache index (ASCI) 210 that maps user and application instance combinations (GUIDs) to auto-saved data, e.g., ephemeral tables (ETs) 212.

Each instance of the ephemeral tables (ET) 212 can be, for example, a table instance i of which $ET_i$ representing a collection of data that is bound to a particular user, a DB schema, and an application instance combination. Instances of ETs can differ from local and global temporary tables, as described above. The ASC 208 can be responsible for managing the configuration and lifecycle of the ETs. For other, previously mentioned, usages of ETs, other non-auto-save related lifecycle management implementations are possible.

An ephemeral table to schema binding (ETSB) 214, also a part of the ASC 208, can provide a definition of mappings between ET 212 attributes and physical application schema (AS 220) table attributes, e.g., where the data is ultimately persisted. Some implementations do not require there to be a one-to-one mapping between ETs and DB tables. For example, in a data model, the attributes in a single ET can map to many DB tables. In some implementations, an ET can be defined that represents, for example, the registration data for an eCommerce site, and the data can physically be persisted in person, user, and address tables. In some implementations, a single ET attribute can map to multiple physical table attributes. For example, to create a new report for Player 1, the ET can include report data, and a report ID, which is mapped to an application schema (AS 220) report table primary key ("PK") and a player report foreign key ("FK"). Alternate examples can exist in which the data model is de-normalized. ASC Metadata (ASCM) 216, for example, can include definitions of the ETs key attributes. For example, an entry 216a, (e.g., $ET_{A,1}$, $A_{1,1}$ $SE_1$ $A_{2,1}$) can indicate that ephemeral table A's attribute $A_1$ is a primary key and should be created using sequence $SE_1$ and also that ephemeral table $A_2$'s attribute $A_1$ should contain the same value. This information can be used during insertion, since during database updates the information will already be available. Note the sequences may, but don't have to be the same. In ASCM 216, for example, Table B1 uses $SE_3$, Table $B_3$ uses $SE_1$, and $A_{2,1}$ and $B_{2,1}$ are foreign keys.

Auto-save update insert interceptors (ASUIs) 218 can be created during ET definitions and can be responsible for updating the application schema 220 with the data from the relevant $ET_i$s that are present in the ETs 212 according to the bindings in the ETSB 214 and metadata in the ASCM 216. The ASUIs 218 can include, for example, SQL data manipulation language (DML) statements, script statements, and/or other proprietary language statements and/or abstractions. ASUIs 218 can represent, for example, the implementation of the mapping of ET attributes to attributes in the application schema 220. In some implementations, resources/scenarios can exist for auto-generating the ASUIs 218. Binding tables 222, for example, can identify specific ephemeral tables that require ASUIs 218 for update.

In some implementations, auto-save functionalities described herein can include application programming interfaces (APIs), e.g., auto-save specific APIs having "ET_" prefixes associated with ephemeral table operations. As an example, an ET_AUTOSAVE operation, depending on whether or not key attributes are specified, can be either in insert mode (e.g., when key attribute(s) are not specified) or update mode (e.g., when key attribute(s) are specified). In insert mode, for example, the mapping of key attributes to the mechanism for populating key attribute fields can be defined during ET creation. Invoking an ET_SAVE operation, for example, can result in the contents of $ET_i$ being persisted to the AS tables specified in the ETSB 214. Invoking an ET_DISCARD operation can result, for example, in the specified $ET_i$ being destroyed with no possibility of data recovery. An ET_LIST operation can return high-level details relating to the user's ETs that exist for a particular application. The ET_LIST operation can be used by the client, for example, to present recovery options to the user. An ET_INVOKE_LIST operation can be invoked by the ASC 208 to indicate that there is recovery data and that the client should deal with it appropriately. An ET_FETCH operation can return, e.g., to the client, auto-saved data in the relevant $ET_i$. Operations for reverting to a previous version can include, for example, ET_SHOW_HISTORY, ET_COMPARE, and ET_ROLLBACK.

In some implementations, different algorithms can be used for auto-saving. In some implementations, the scheduling of auto-save can be entirely the responsibility of the client (e.g., the client 106 or applications running thereon). For example, application designers can specify that the auto-save functionality is to be initiated when specific input fields are exited, after a particular period of time, or according to any other algorithm that is implemented. Generally, the client code can reside where the auto-save policy is implemented, and data can be auto-saved prior to saving it. For the purposes of the following descriptions, it can be assumed that the user has adopted a time-based approach (e.g., data is auto-saved every n seconds).

In some implementations that use auto-save operations, during an initial back-end connection, the client can be provided with a GUID that identifies the user, application instance, and/or host combination. After some time, the client code may realize that the client code should auto-save the data present in the current input dialog, e.g., after n seconds have elapsed since the dialog was opened and initial data entry commenced. At this time, the client can invoke, e.g., ET_AUTOSAVE(GUID,ET,DATA . . . ), resulting in the DBMS ASC 208 receiving the user and application type ID. If an instance of an ET 212 already exists (query ASCI 210) for the given user/application type ID, the current ET instance can be used. Otherwise (e.g., if an ET instance 212 does not already exist for the given user/application type ID), a new ET instance can be created, auto-save data can be written to the table, and control can be returned to the client. In some implementations, ET_AUTOSAVE that is implemented as an insert or update can support rewinding the data.

In some implementations of a save (e.g., commit) operation, after user entry of data and selection (e.g., by clicking) a save or equivalent option, the client can invoke ET_SAVE (GUID,ET) or some other operation. Query ASCI 210 then, using the ASCM and the ASUI, the contents of the $ET_i$ can be persisted (e.g., using either an insert or update) to the relevant AS 220 schema table(s). The ASC 208 can determine if the operation is an update or insert, for example, by inspecting the ASCM primary keys fields in the ETs. Upon completion of persisting the data, the ASC 208 can delete the associated $ET_i$.

In some implementations of a cancel operation, e.g., if the user has entered some or all of the data and wishes to cancel data entry, and the user may select a cancel (or equivalent) button or option. As a result, the client can invoke ET_CANCEL(GUID,ET) or other such operation. As a result, the ASC 208, using the ASCI 210, can delete entries associated with the user inputs from the corresponding $ET_i$.

In some implementations of a recover operation, the recovery process may be explicitly initiated (e.g., on a particular input form by a client/user) or login-activated (e.g., the user may be logging into the application, and the ASC 208 may offer the user the opportunity to recover previously auto-saved data). For example, in an explicit initiation, for example, the client can invoke ET_LIST (GUID,ET), the ASC 208 can return the auto-save history for the ET, and the user can either recover the last auto-saved version or revert to a previous version. In login-based initiation, for example, the ASC 208 can push an ET_INVOKE_LIST message to the client, e.g., informing the client that for a particular user/application combination there is auto-saved content available for recovery. The client can invoke ET_LIST(CONTENT_FLAG) or other such operation, and the client can be presented with a relevant list of auto-saved content that can be recovered, e.g., with the CONTENT_FLAG representing rules for the content that should be returned. The client can be responsible for presenting this to the user and managing the invocation of the recovery process, during which the dialog can be populated with the relevant data.

In some implementations of a revert operation, the user may wish to revert to an earlier auto-save point. In this case, the user can select the version of interest, and a revert command can be issued. The auto-save cache can then provide the user entries associated with the user-specified version.

Figure 3A:
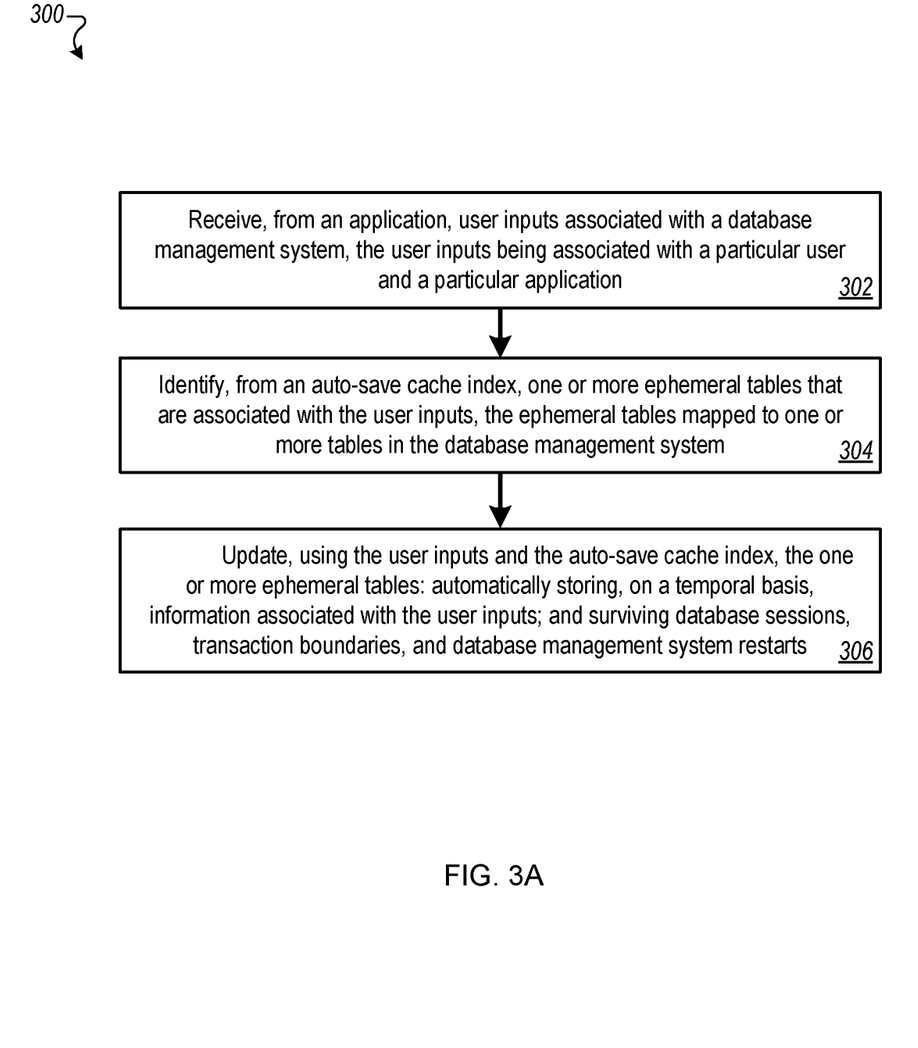
FIG. 3A is a flowchart of an example method for auto-saving data using ephemeral tables.

FIG. 3A is a flowchart of an example method 300 for auto-saving data using ephemeral tables. For clarity of presentation, the description that follows generally describes method 300 in the context of FIGS. 1 and 2.

At 302, user inputs are received from an application that are associated with a database management system. The user inputs are associated with a particular user and a particular application instance (e.g., through the use of the GUID). For example, the user input processor 115 can receive user inputs (e.g., text input on a web page) that are associated with the user connections 206. The user inputs can be from one of the client applications 204 executing on one of the clients 106.

At 304, one or more ephemeral tables that are associated with the user inputs are identified from an auto-save cache index that maps the ephemeral tables to one or more tables in the database management system. For example, for the received user inputs associated with specific ones of the user connections 206, the ephemeral table chooser 117 can identify specific ephemeral tables 212 that are to be updated for auto-caching the received user inputs. Identification of the specific ephemeral tables 212 can be facilitated, for example, using an auto-save cache index (e.g., the ASCI 210) or in other ways.

At 306, the one or more ephemeral tables are updated using the user inputs and the auto-save cache index. For example, the ephemeral table updater 119 can update the specific ephemeral tables 212 that are identified by the ephemeral table chooser 117. The updating can use the information in the ASCI 210, for example, to update the ephemeral table(s) 212 for the user and user connection information associated with the received user inputs. Further, the updating includes automatically storing, on a temporal basis, information associated with the user inputs, e.g., storing the information associated with the user inputs for a given time period, or in other temporal ways identified above. The storage also survives database sessions, transaction boundaries, and database management system restarts, e.g., as ephemeral tables are not lost at the end of a database session, nor are the ephemeral tables lost at transaction boundaries or forfeited in the case of a DBMS restart.

In some implementations, the method 300 further includes performing a save/commit operation. An indication is received to perform a save/commit operation, such as when the user has entered all the data and the elects to save the data, e.g., by selecting/clicking an option or entering a dialog. The save/commit operation includes, for example, using an ephemeral-table-to-schema binding to determine database tables in the database management system that are to be updated based on entries in the one or more ephemeral tables. The save/commit operation also includes, for example, updating the determined database tables using entries in the one or more ephemeral tables. For example, the save/commit operation can be implemented using the save/commit engine 121, which can invoke interceptors 218 that use information from binding tables 222 to update database 113.

In some implementations, updating the determined database tables includes using one or more auto-save update/insert interceptors that update the determined database tables using one or more application schemas. For example, the interceptors 218 can update application schemas 220 with the data from the relevant $ET_i$s as described above.

In some implementations, the method 300 further includes maintaining metadata associated with the auto-save cache, the metadata describing details regarding data being persisted in the one or more ephemeral tables, and using the maintained metadata when updating the determined database tables AS 220. For example, the ASC 208 can maintain the ASC metadata 216 that is subsequently used by the ASUIs 218.

In some implementations, the method 300 further includes a cancel operation. For example, the cancel operation may be initiated if the user has entered some or all of a logical group of data in an application (e.g., a form or page) and selects a cancel option to cancel data entry. As a result, the client 106 can provide, to the server 104, an indication to cancel the user inputs that have been auto-saved, including identifying the particular user and the particular application associated with the user inputs. For example, the client 106 can invoke ET_CANCEL(GUID, ET) or other such operation. As a result, using at least the cancel engine 123, for example, the user inputs can be cleared from the auto-save cache 208, including deleting corresponding entries in the one or more ephemeral tables 212 associated with the particular user and the particular application. For example, the ASC 208, using the ASCI 210, can delete entries in the corresponding $ET_i$ and update the ASCI 210 accordingly.

In some implementations, the method 300 further includes a recovery operation. For example, the recovery operation may be explicitly initiated, on a particular input form, by the user. In another example, the recovery operation may be initiated when the user logs into an application and an opportunity is offered to the user to recover previously auto-saved data. As a result, the client 106 can provide, to the server 104, an indication to recover the user inputs that have been auto-saved, including identifying the particular user and the particular application associated with the user inputs. For example, when the recovery operation is explicitly initiated, using at least the recover engine 125, for example, the client 106 can invoke ET_LIST(GUID,ET) or other such operation, and the ASC 208 can provide the corresponding entries from the one or more ephemeral tables 212 associated with the particular user and the particular application.

In some implementations, the method 300 further includes a revert operation. For example, the revert operation may be initiated when the user wishes to revert to an earlier auto-saved point. The ASC 208 can receive, from the client 106, an indication to revert the user inputs to a previous version, including identifying (e.g., using the GUID) the particular user and the particular application associated with the user inputs. The ASC 208 can also receive, from the client 106, a version of interest associated with the user inputs. Using the received information, the revert engine 127, for example, can retrieve the corresponding entries from the one or more ephemeral tables 212 associated with the version, the particular user, and the particular application, and the ASC 208 can provide the user inputs to the client 106.

Figure 3B:
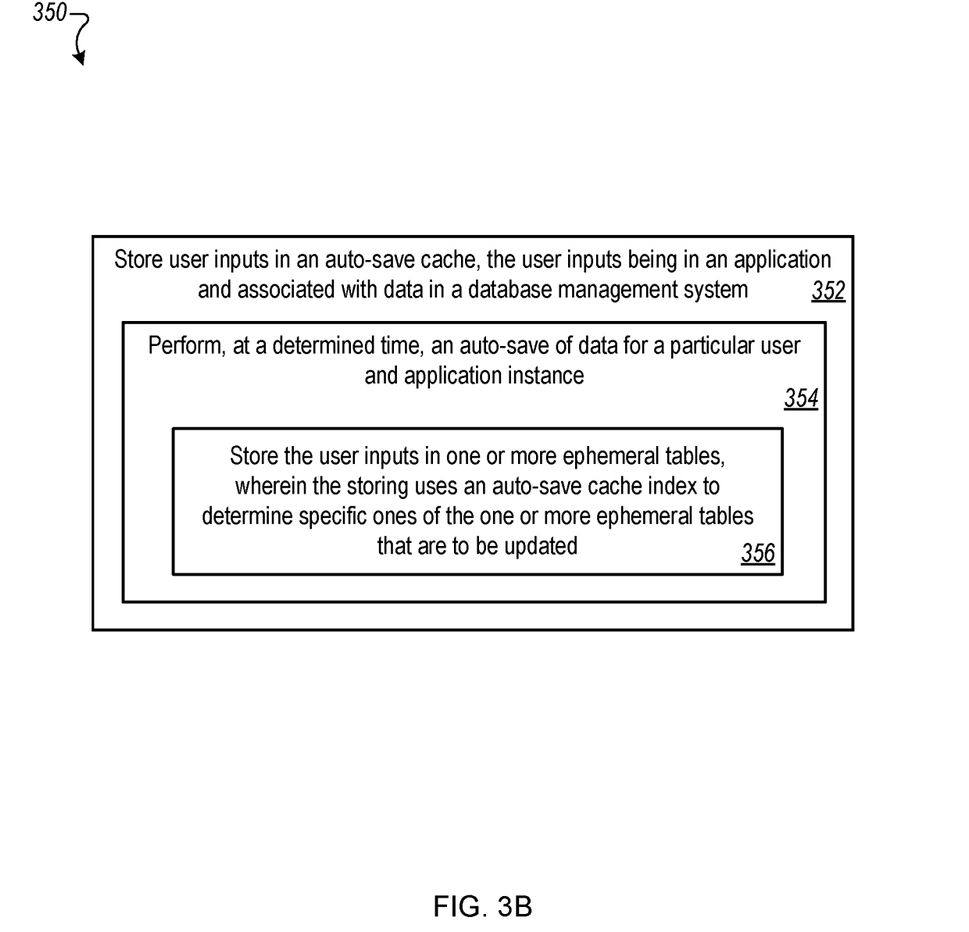
FIG. 3B is a flowchart of an example method for using ephemeral tables to auto-save data at a pre-determined time.

FIG. 3B is a flowchart of an example method 350 for using ephemeral tables to auto-save data at a pre-determined time. For clarity of presentation, the description that follows generally describes method 300 in the context of FIGS. 1 and 2.

At 352, user inputs are stored in an auto-save cache. The user inputs are made using an application and are associated with data in a database management system. For example, FIG. 2 represents the storage of user inputs using the ASC 208. Further, auto-saving can be facilitated using the server 104, as described above.

At 354, at a determined time, an auto-save is performed, the auto-save saving data for a particular user and application instance. For example, an auto-save can occur when user inputs are received that are associated with one of the user connections 206. Step 354 can serve, for example, as a trigger for step 352. The ephemeral table chooser 117, for example, can determine which of the ephemeral tables 212 are to be updated as part of the auto-save.

In some implementations, the method 350 further includes determining the time to perform an auto-save. For example, the determined time to perform the auto-save can include determining a time when input fields of the application are exited, determining a time that is after a particular period of time has elapsed (e.g., since the last auto-save), or determining a time according to an implemented algorithm associated with an auto-save policy. Some auto-save policies may specify, for example, a combination of rules, such as time-based saves, an amount of date entered by the user, a type of data, a time-of-day, an application type, a device type (e.g., auto-saving more often on mobile devices than non-mobile devices), application contexts (e.g., at a logical break in a form or group of inputs), and/or other rules.

At 356, the user inputs are stored in one or more ephemeral tables. The storing uses an auto-save cache index to determine specific ones of the one or more ephemeral tables that are to be updated. For example, the ephemeral table updater 119 can update the specific ephemeral tables 212 that are identified by the ephemeral table chooser 117. The updating can use the information in the ASCI 210, for example, to update the ephemeral table(s) 212 for the user and user connection information associated with the received user inputs.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
    receiving, from an application, user inputs associated with a database management system, the user inputs being associated with a particular user and a particular application;
    identifying, from an auto-save cache index, one or more ephemeral tables that are associated with the user inputs, the ephemeral tables mapped to one or more tables in the database management system;
    updating, using the user inputs and the auto-save cache index, the one or more ephemeral tables:
        automatically storing, on a temporal basis, information associated with the user inputs; and
        surviving database sessions, transaction boundaries, and database management system restarts, wherein surviving includes being retained and not being deleted or lost; and
    performing a revert operation including:
        receiving an indication to revert the user inputs to a previous version, including identifying the particular user and the particular application associated with the user inputs;
        receiving a version of interest associated with the user inputs;
        retrieving the user inputs from the auto-save cache, including entries in the one or more ephemeral tables associated with the version, the particular user, and the particular application; and
        providing the user inputs.

2. The method of claim 1, further comprising performing a save/commit operation, including:
    receiving an indication to perform a save/commit operation;
    using an ephemeral-table-to-schema binding to determine database tables in the database management system that are to be updated based on entries in the one or more ephemeral tables; and
    updating the determined database tables using entries associated with the user inputs in the one or more ephemeral tables.

3. The method of claim 2, wherein updating the determined database tables includes using one or more auto-save update/insert interceptors that update the determined database tables using one or more application schemas.

4. The method of claim 1, further comprising:
    maintaining metadata associated with the auto-save cache, the metadata describing details regarding data being persisted in the one or more ephemeral tables; and
    using the maintained metadata when updating the determined database tables.

5. The method of claim 1, further comprising performing a cancel operation including:
    receiving an indication to cancel the user inputs that have been auto-saved, including identifying the particular user and the particular application associated with the user inputs; and
    clearing the user inputs from the auto-save cache, including deleting corresponding entries in the one or more ephemeral tables associated with the particular user and the particular application.

6. The method of claim 1, further comprising performing a recovery operation including:
    receiving an indication to recover the user inputs that have been auto-saved, including identifying the particular user and the particular application associated with the user inputs;
    retrieving the user inputs from the auto-save cache, including entries in the one or more ephemeral tables associated with the particular user and the particular application; and
    providing the user inputs.

7. A method comprising:
    storing user inputs in an auto-save cache, the user inputs being in a particular application and associated with data in a database management system, wherein storing includes:
        performing, at a determined time, an auto-save of data for a particular user and an application instance of the particular application, including:
            storing the user inputs in one or more ephemeral tables, wherein the storing uses an auto-save cache index to determine specific ones of the one or more ephemeral tables that are to be updated, wherein the one or more ephemeral tables survive database sessions, transaction boundaries, and database management system restarts, and wherein surviving includes being retained and not being deleted or lost; and
    performing a revert operation including:
        receiving an indication to revert the user inputs to a previous version, including identifying the particular user and the particular application associated with the user inputs;
        receiving a version of interest associated with the user inputs;
        retrieving the user inputs from the auto-save cache, including entries in the one or more ephemeral tables associated with the version, the particular user, and the particular application; and
        providing the user inputs.

8. The method of claim 7, further comprising determining the time to perform the auto-save, wherein determining the time to perform the auto-save includes determining a time that is one of:
    when input fields are exited,
    after a particular period of time, or
    according to an implemented algorithm associated with an auto-save policy.

9. A system comprising:
memory storing:
- a data store of metadata associated with auto-saving information associated with user connections; and
- an application for:
  - receiving, from an application, user inputs associated with a database management system, the user inputs being associated with a particular user and a particular application;
  - identifying, from an auto-save cache index, one or more ephemeral tables that are associated with the user inputs, the ephemeral tables mapped to one or more tables in the database management system; and
  - updating, using the user inputs and the auto-save cache index, the one or more ephemeral tables, wherein the one or more ephemeral tables are separate from, but include schema binding to, the one or more tables in the database management system, wherein the ephemeral tables include row and columns corresponding to the user inputs and include values corresponding to the user inputs that not yet applied to the one or more tables in the database management system, and wherein updating the one or more ephemeral tables includes:
    - automatically storing, on a temporal basis, information associated with the user inputs; and
    - surviving database sessions, transaction boundaries, and database management system restarts, wherein surviving includes being retained and not being deleted or lost.

10. The system of claim 9, the application further comprising performing a save/commit operation, including:
- receiving an indication to perform a save/commit operation;
- using an ephemeral-table-to-schema binding to determine database tables in the database management system that are to be updated based on entries in the one or more ephemeral tables; and
- updating the determined database tables using entries associated with the user inputs in the one or more ephemeral tables.

11. The system of claim 9, wherein updating the determined database tables includes using one or more auto-save update/insert interceptors that update the determined database tables using one or more application schemas.

12. The system of claim 9, the application further comprising:
- maintaining metadata associated with the auto-save cache, the metadata describing details regarding data being persisted in the one or more ephemeral tables; and
- using the maintained metadata when updating the determined database tables.

13. The system of claim 9, the application further comprising performing a cancel operation including:
- receiving an indication to cancel the user inputs that have been auto-saved, including identifying the particular user and the particular application associated with the user inputs; and
- clearing the user inputs from the auto-save cache, including deleting corresponding entries in the one or more ephemeral tables associated with the particular user and the particular application.

14. The system of claim 9, the application further comprising performing a recovery operation including:
- receiving an indication to recover the user inputs that have been auto-saved, including identifying the particular user and the particular application associated with the user inputs;
- retrieving the user inputs from the auto-save cache, including entries in the one or more ephemeral tables associated with the particular user and the particular application; and
- providing the user inputs.

15. A non-transitory computer-readable media encoded with a computer program, the program comprising instructions that when executed by one or more computers cause the one or more computers to perform operations comprising:
- receiving, from an application, user inputs associated with a database management system, the user inputs being associated with a particular user and a particular application;
- identifying, from an auto-save cache index, one or more ephemeral tables that are associated with the user inputs, the ephemeral tables mapped to one or more tables in the database management system;
- updating, using the user inputs and the auto-save cache index, the one or more ephemeral tables:
  - automatically storing, on a temporal basis, information associated with the user inputs; and
  - surviving database sessions, transaction boundaries, and database management system restarts, wherein surviving includes being retained and not being deleted or lost; and
- performing a revert operation including:
  - receiving an indication to revert the user inputs to a previous version, including identifying the particular user and the particular application associated with the user inputs;
  - receiving a version of interest associated with the user inputs;
  - retrieving the user inputs from the auto-save cache, including entries in the one or more ephemeral tables associated with the version, the particular user, and the particular application; and
  - providing the user inputs.

16. The non-transitory computer-readable media of claim 15, the application further comprising performing a save/commit operation, including:
- receiving an indication to perform a save/commit operation;
- using an ephemeral-table-to-schema binding to determine database tables in the database management system that are to be updated based on entries in the one or more ephemeral tables; and
- updating the determined database tables using entries associated with the user inputs in the one or more ephemeral tables.

17. The non-transitory computer-readable media of claim 15, wherein updating the determined database tables includes using one or more auto-save update/insert interceptors that update the determined database tables using one or more application schemas.

18. The non-transitory computer-readable media of claim 15, the application further comprising:
- maintaining metadata associated with the auto-save cache, the metadata describing details regarding data being persisted in the one or more ephemeral tables; and
- using the maintained metadata when updating the determined database tables.

19. The non-transitory computer-readable media of claim 15, the application further comprising performing a cancel operation including:
   receiving an indication to cancel the user inputs that have been auto-saved, including identifying the particular user and the particular application associated with the user inputs; and
   clearing the user inputs from the auto-save cache, including deleting corresponding entries in the one or more ephemeral tables associated with the particular user and the particular application.

* * * * *